July 17, 1951

E. T. BLAZEWICZ 2,560,550

SNAP HOOK

Filed Dec. 2, 1949

Inventor
Edmond T. Blazewicz

By Clarence A. O'Brien
and Harvey B. Jacobson
Attorneys

Patented July 17, 1951

2,560,550

UNITED STATES PATENT OFFICE 2,560,550

SNAP HOOK

Edmond T. Blazewicz, Chicago, Ill.

Application December 2, 1949, Serial No. 130,714

3 Claims. (Cl. 24—234)

This invention relates to new and useful improvements in snap hooks, and more particularly pertains to the novel means provided for releasing the latch.

The primary object of this invention is to provide a snap hook in which the latch moves automatically to the latching position, and which may be unlatched efficaciously by a means that is not subject to inadvertent actuation.

Another important object of this invention is to provide a snap hook of this character in which the working parts thereof are concealed in the interests of longer life to the working parts, less likelihood of the device becoming inoperative, and for a more pleasing appearance of the same.

Another important object of the invention is to provide a snap hook which is normally in the latched position, and which requires for release of the same a force directed toward the hook.

Still another object of this invention is to provide a snap hook which may be readily engaged with an object and which, while realizing the aforementioned objects of this invention, may have a swivel attached thereto for free use of the hook when engaged with objects subject to rotation.

A meritorious feature of this invention resides in the inherent sturdiness and durability of the device that stems from the fact that the same is constructed from a shank of integral construction, having a hook formed at one end thereof, a sleeve slidable on the shank, and the working parts of the snap hook almost entirely disposed in the hollow shank.

Another important feature of the present invention resides in the latch being pivoted within the shank, while the latch release element is slidable in the shank and responsive to sliding movement of the sleeve on the shank to move the latch against the spring normally retaining the latch in the latching position.

Another feature of the present invention resides in the resilient means provided in the shank for urging the sleeve to the retracted position remote from the hook, whereby the hook is free to receive and retain an object received therein.

A final important feature to be specifically enumerated herein resides in the connection between the latch release element and the sleeve, and the concealment of the working parts within the shank.

These, together with various ancillary features and objects of the invention which will later become apparent as the following description proceeds, are attained by the present invention, preferred embodiments of which have been illustrated by way of example only in the accompanying drawings, wherein.

Figure 1:
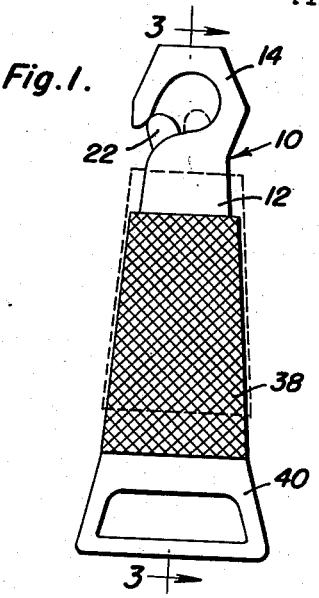
Figure 1 is a side elevational view of the present invention, which the alternate unlatched position of the sleeve and the latch being indicated in dotted outline.
Figure 2:
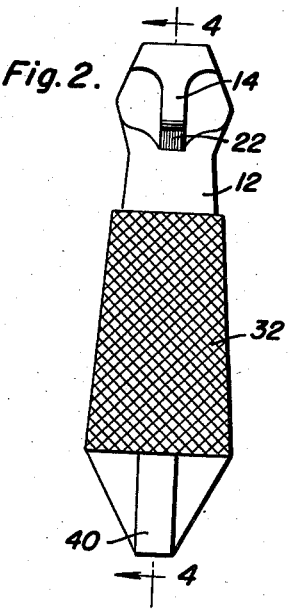
Figure 2 is a front elevational view of the present invention.
Figure 3:
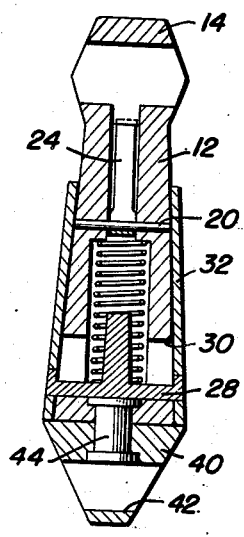
Figure 3 is a vertical transverse sectional view of the snap hook, being taken substantially upon the plane of the section line 3—3 of Figure 1.
Figure 4:
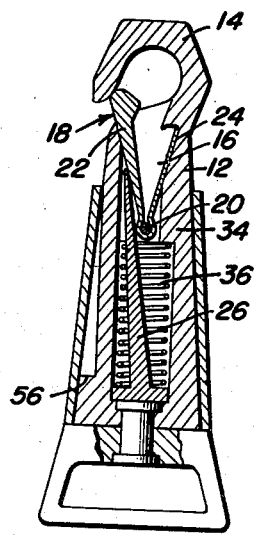
Figure 4 is another vertical sectional view of the snap hook being taken at right angles to the view shown in Figure 3 and is taken upon the plane of the section line 4—4 of Figure 2.

Reference is now made more specifically to the accompanying drawings, wherein like numerals designate similar parts throughout the various views. Attention is first directed to the form of the invention illustrated in Figures 1-4, wherein the numeral 10 designates the snap hook generally.

The snap hook 10 comprises an elongated shank 12 having a hook 14 formed at the upper end thereof. The shank 12 is provided with a recess 16 in which a latching member, indicated generally by the numeral 18, is pivotally secured by a pivot pin 20 secured in the shank 12. The latching member 18 is preferably of unitary construction and includes a latch 22 and a spring 24. As may be readily seen in Figure 4, the spring 24 is seated against the wall defining the recess 16 and yieldingly urges the latch 22 into a position closing the hook 14.

A substantially T-shaped latch release element having a central leg 26 and lateral arms 28 is provided, the leg 26 being slidingly disposed in the recess 16 with the lateral arms 28 extending laterally through the shank 12 adjacent its lower end through slots 30 to have the extremities thereof in pivotal engagement with a sleeve 32 slidable upon the shank 12.

It will be noted that the upper end of the leg 26 is in contact with the latch 22, and that the arrangement of the leg 26 and the latch 22 is such that upward movement of the leg 26 causes pivotal movement of the latch 22 about the pivot 20 to the position opening the hook 14. It will be obvious that upward sliding movement of the leg 26 may be brought about by sliding the sleeve 32 upwards on the shank 12 and that this movement is permitted by the provision of the slots 30 in the shank 12.

Means is provided to resiliently urge the leg 26 to its lowermost position, whereby the latch 22 is normally retained in the latched position, which includes the provision of a shoulder 34 in the wall defining the recess 16 and a coiled compression spring 36 about the leg 26 which is seated between the shoulder 34 and the arms 28. It will be evident that the spring 36 normally retains the leg 26 and the sleeve 32 in their lowermost positions. However, it will be equally as obvious that the sleeve 32 may be moved upwardly on the shank 12, the outer surface of the sleeve 32 being serrated as at 38 to facilitate this operation, to raise the leg 26 and to thereby pivot the latch 22 into the unlatched position.

A swivel 40 having an opening 42 is pivotally connected to the lowermost end of the shank 12 by a swivel rivet 44, whereby the snap hook 10 may be readily attached to a leash or the like.

Figure 5:
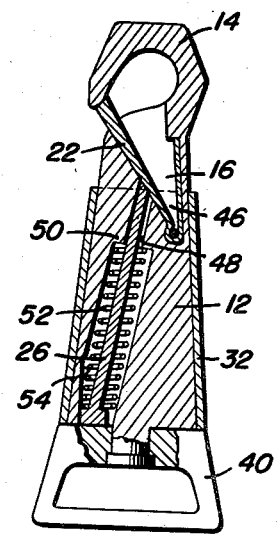
Figure 5 is a vertical sectional view similar to that shown in Figure 4, with the same being slightly modified.

Attention is now directed to the form of the invention illustrated in Figure 5, which is substantially identical with the form of the invention illustrated in Figures 1–4, differing only in fact that the recess 16 includes two angularly inclined portions 46 and 48, respectively, which permits the leg 26 to engage the latch 22 at a higher angle of incidence, the latch 22 being pivoted in the branch of the recess 16, indicated at 46, and the leg 26 being slidable in the branch of the recess 16 numbered 48. It will be noted that in this modification of the invention that the shoulder 50 forms a seat for the spring 52 in a manner analogous to that of the other form of the invention. However, the recess 48 is enlarged, as at 54, to permit the lower end of the leg 26 to move vertically upon upward sliding movement of the sleeve 32. It will be evident that this form of the invention possesses the advantage of requiring relatively less upward sliding movement of the sleeve 32 to unlatch the latch 22 than is required in the other form of the invention.

Referring again to Figure 4, it will be noted that a portion 56 of the shank 12 has been cut away to permit easier assembly of the snap hook 10.

The present invention possesses several inherent advantages. The hook 14 may easily engage an object upon depressing the latch 22, but which, when once received thereon, may only be removed by use of the sleeve 32. Since upward sliding movement of the sleeve 32 towards the hook 14 is required to release the latch 22, it will be readily apparent that a highly efficient and positive snap hook has been provided. The concealment of the working parts of the snap hook 10 not only lends appreciably to the appearance of the device, but contributes materially to a long life of the same by not admitting of grit or the like, and thereby assuring continuous satisfactory operation of the same.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. A snap hook comprising an elongated shank having a hook formed at one end thereof and being provided with a recess, a latch pivotally mounted in said recess and a spring in said recess yieldingly urging said latch into a position closing said hook, a sleeve embracing and slidable on said shank, means responsive to movement of said sleeve towards said hook to open said latch including a release element slidable in said recess and engaging said latch, said shank having a slot through which said release element is connected to said sleeve, and a second spring in said recess urging said sleeve away from said hook.

2. The combination of claim 1, including a shoulder formed in the wall defining said recess, said second spring being seated between said shoulder and said release element.

3. The combination of claim 2, wherein said latch and spring are of unitary construction and are pivoted to the shank at their juncture, said release element being substantially T-shaped with the central leg thereof extending through said second spring.

EDMOND T. BLAZEWICZ.

REFERENCES CITED

The following references are of record in the file of this patent:

UNITED STATES PATENTS

| Number | Name | Date |
|---|---|---|
| 759,806 | Broga | May 10, 1904 |
| 1,025,666 | Yeagle | May 17, 1912 |